United States Patent [19]

Shew

[11] 4,343,615

[45] Aug. 10, 1982

[54] PROCESS FOR FORMING PRINTING CHARACTERS

[76] Inventor: David S. Shew, 1402 Powell St., San Francisco, Calif. 94133

[21] Appl. No.: 183,073

[22] Filed: Sep. 2, 1980

[51] Int. Cl.[3] .......................... B32B 31/00; B26D 7/06; A44C 3/00

[52] U.S. Cl. ...................................... 493/325; 40/2 R; 156/265; 156/277; 412/2; 493/343; 354/292

[58] Field of Search ............... 493/325, 324, 343, 344, 493/334; 156/277, 250, 264, 265; 40/2; 354/292; 11/1 ET, 1 B, 1 R

[56] References Cited

U.S. PATENT DOCUMENTS 1,793,552 2/1931 Kast .................................. 11/1 R X
2,645,795 7/1953 Pitner .................................. 11/1 R
3,824,614 7/1974 Shew .................................. 354/292
4,188,251 2/1980 Grass et al. ..................... 156/277 X
4,289,561 9/1981 Holzknecht ...................... 156/277 X

*Primary Examiner*—James F. Coan

[57] ABSTRACT

Stacks of individual relatively small rectangular sheets bearing printed characters are formed by first printing the characters in a grid on a substantially larger sheet, then stacking those sheets in registration, wrapping it with a transparent adhesive material, cutting it into strips along the grid line, coating the surfaces exposed in the cut with adhesive material and reconstituting the strips into a tablet or pad. Then cutting the tablet or pad laterally and removing the last layer of adhesive material applied before arranging the stacks into an index selector board for use in composing strips of type.

4 Claims, 4 Drawing Figures

PROCESS FOR FORMING PRINTING CHARACTERS

This invention relates generally to the printing arts and specifically concerns the production of type upon relatively small sheets suitable for making camera-ready paste-up compositions. The invention is especially useful in connection with the subject matter disclosed in my issued U.S. Pat. No. 3,824,614 granted July 16, 1974 and entitled "Equipment for Manufacturing Printed Matter."

In my earlier patent I disclosed within a system for manufacturing printed matter the concept of printing individual characters on a sheet of paper or the like in rows and columns. The sheets with characters printed on one surface were advanced into a machine wherein punches would cut the sheet into paper squares, each containing a printed character on one surface. The squares were collected into a container such that each container contained a plurality of squares with like characters. In some circumstances it was desirable to stack the sheets and to punch a plurality of sheets in one operation.

The containers holding the stack of squares were placed into a selector board compartmentalized into a plurality of rows and columns indexed in a logical sequence adapted to the language being printed. As a compositor went about the task of setting type, the individual squares were lifted from the open top containers with a probe-like hand tool and placed into a composition strip to form a line of type. After the necessary lines of type have been arranged in the desired position the work, known as paste-up copy, was photographed by a plate making camera so as to produce a printing plate.

In the present invention, the punching and stacking operation disclosed in the above patent is altogether eliminated as is the container for holding the stack-up type squares.

In summary, the present invention is concerned with the method of forming printing characters suitable for photographing and the steps involved include first printing a grid of crossed lines on a sheet of material and then printing characters into the squares defined by the grid lines, the grid lines and the characters being made with materials which are respectively photographically invisible and visible. The sheets thus marked are stacked such that the grids and characters are in substantial registration, thus forming a pad of sheets which are then wrapped with a transparent adhesive material to form a firm pad. A subsequent step is cutting the pad along parallel grid lines to form strips having a length and thickness equal to that of the pad and each carrying one column of printed characters. The surfaces exposed in the cutting operation are treated with an adhesive material and the strips are juxtaposed so as to reconstitute the pad which is then wrapped along the end and top portions; and then cutting the reconstituted pad along the other parallel grid lines to produce stacks of like print characters which are adhesively connected together in stack form along two parallel, opposite sides and then arranging the stacks in a selector board.

A primary object of my invention is to provide an improved method of manufacturing printed matter characterized by the elemination of containers for holding individual sets or piles of printing characters.

Another object of the invention is to provide an improved method for producing printed characters which facilitate subsequent handling of characters in groups in convenient stacked array.

Another object of the invention is to provide an improved method for creating printed matter which appreciably increases the speed of production of copy at appreciably less manufacturing expense.

Other objects of the invention, together with certain advantages thereof, will appear from the following description of a preferred method as illustrated schematically in the accompanying drawings.

Figure 1:
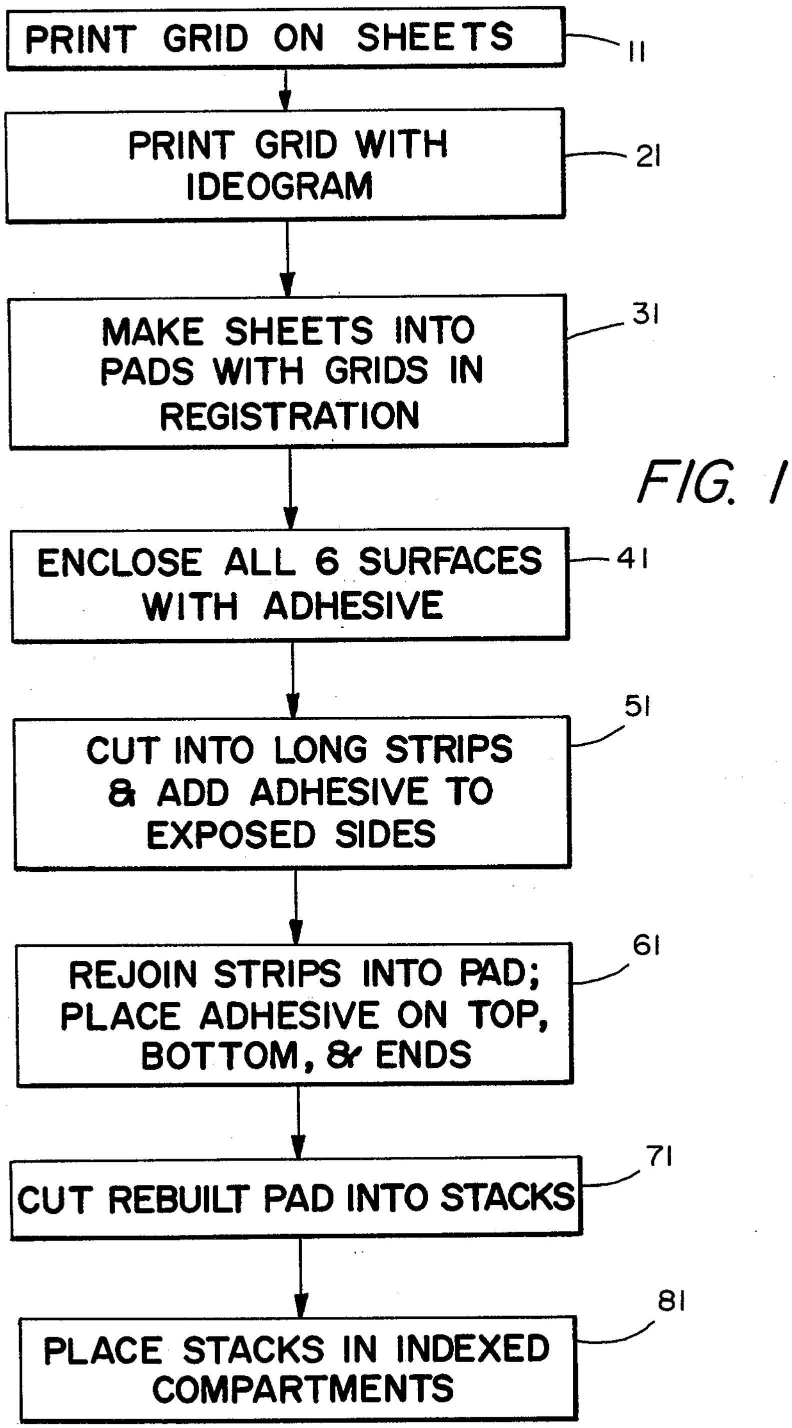
FIG. 1 is a flow chart illustrating the several steps of the present invention.
Figure 4:
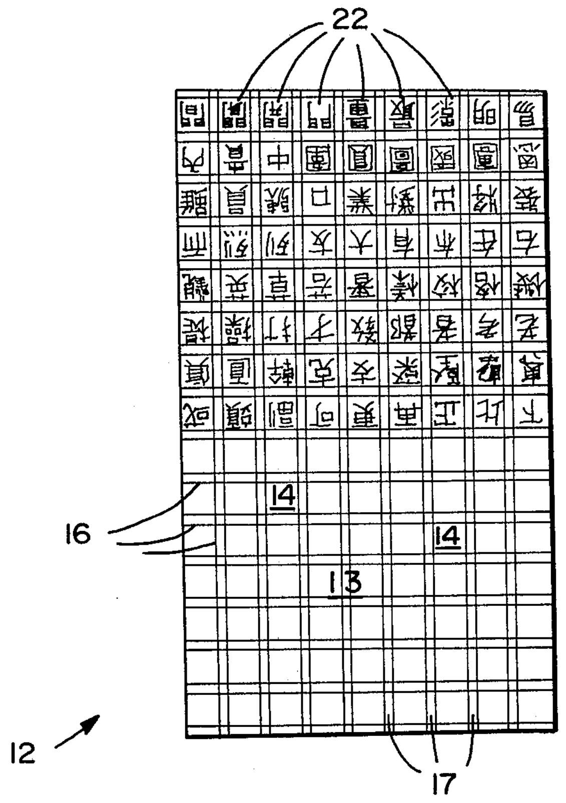
FIG. 4 illustrates a sheet of material having a plurality of characters thereon arranged on a grid.

Referring to FIGS. 1 and 4 of the drawings, in the practice of the present invention I designate the first step 11 which includes providing a sheet 12 indeterminate dimensions upon which I delineate by means of a suitable ink a grid 13 formed by a plurality of straight lines intersecting at 90° so as to define a rectangular or generally square field 14 of equal size throughout the sheet 12. As shown in FIG. 4, the lines which define the fields 14 may be double lines 16 such that a corridor 17 is defined between each pair of double lines and the corridor will serve in a later step as a guide for cutting. Alternatively, the double lines may be a single line or a wide single line to facilitate the alignment for the cutting operation. As will become apparent below, the ink used to form the lines 16 is preferably of a material which becomes photo-invisible so that in the final made-up type the line 16 will not be seen. Inks suitable for this purpose are well known in the art.

In a following step 21, as illustrated in FIG. 1, I print into the plurality of fields 14 a plurality of characters 22 such that a field will contain one character only so that the character occupies no more area than that defined by the field into which it is printed. It will be understood that the characters delineated upon the sheet 12 can be all the same character in each row and each column, or a plurality of different characters 22 can be printed in the various rows and columns of each sheet 12. Moreover, when I refer to characters, the term may include not only numerals but also upper case and lower case characters including large and small numerals and while I have illustrated the characters 22 in FIG. 4 as denoting Chinese ideograms, the alphabet as used in Western languages can also be printed in the grid. Inks employed in placing the characters upon the sheet 12 should be those which are photo-opaque or visible during the photographic process used in making printing plates and inks of this character as well understood in the trade.

After a number of sheets have been prepared in accordance with steps 11 and 21, a subsequent step 31 may be undertaken and this includes arranging the sheets 12 into a pad or tablet in a manner such that the grid on each sheet is in substantial alignment or registration with the grid on the sheet below and this will place the printed characters 22 in similar position in registration.

For example, from fifty to one hundred sheets 12 may be assembled into a pad or tablet depending upon the needs and capacity of equipment available for the subsequent steps of cutting.

Once the sheets 12 are arranged properly in pad or tablet configuration, the subsequent step 41 of the invention involves wrapping the pad so as to enclose all six surfaces thereof with a transparent adhesive material. That is, the top, bottom, the two ends and the two sides are all wrapped or enclosed by a transparent material such as the transparent tape or sheet available in the market under the trademark SCOTCH of the 3M Company in Minneapolis, Minn. Many suitable transparent or translucent adhesive water plastic sheet materials are available to serve as a wrapping for the pad or tablet, the requirement being that the grid on the top sheet be visible for proper alignment of the cutting tool in the next step and that the sheets be held firmly together by the wrapping to facilitate the cutting operation. Thus, with the completion of this step, all six surfaces of the pad are enclosed within an adhesive wrapping. In the next step 51 the pad is cut into strips and if the grid 13 is formed by double lines 16 the saw or other cutter may pass down the corridor 17, or if no double line is present the saw or blade may simply split the line to form a strip having a width substantially equal to that of the field 14, a length and thickness of the pad. Once the pad has been cut entirely into strips the surfaces thus exposed in the cutting operation are treated with bonding adhesive or with transparent tape of the character discussed above.

Figure 2:
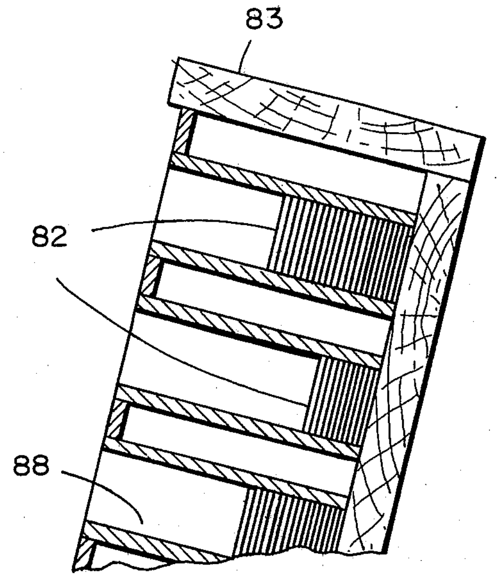
FIG. 2 is a fragmentary, schematic view of a portion of a selector board for containing stacks of type produced with the process of the present invention.
Figure 3:
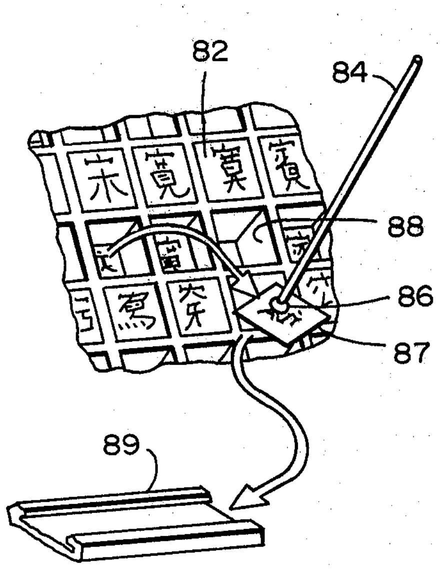
FIG. 3 is a fragmentary, schematic view of a portion of the selector board and showing a character-lifting probe or pick-up device and a composition strip useful with the present invention.

The next operational step 61 involves reconstituting the pad by placing the long strips together so that the lines delineating the fields 14 are in alignment and thus the characters 22 within the adjacent fields are substantially aligned. The strips are held into the pad form by wrapping the top and end portions of the pad with a transparent adhesive material like that discussed above. The reconstituted pad is then ready for the second cutting step 71 in which the cut is made at 90° of the previous cutting step 51 and the lines 16 are used as an index for the cutting mechanism be it saw or blade. At the completion of the cutting step 71 the product is in a series of strips with a surface on each side exposed by reason of the cut. The parts are held into strip form by reason of the adhesive wrapping placed on the top and bottom of the reconstituted pad in step 61. Upon removal of this top and bottom layer of adhesive wrapping the strips formed in step 71 become individual stacks of print characters. The characters are maintained in stack configuration by reason of the adhesive wrapping placed on the long strips in step 51 at the side portions exposed during the first cutting operation. Referring to FIG. 2, the stacks 82 may be arranged in a selector board 83 of the construction disclosed in my U.S. Pat. No. 3,824,614 such that the top of each stack is visible in the selector board as shown in FIG. 3. A probe 84 with a suction element 86 on its end is used by the type compositor for lifting the individual type element 87 from the rectangular compartment 88 of the selector board for placement into the composition strip 89. When a suitable length of type has been placed in the composition strip 89 the type is then transferred to a sheet for photographing in the making of a photo plate for printing.

As mentioned above, the ink employed for placing the grid 13 on the sheets should be selected from available ink materials so that it does not appear or is photo-invisible in the making of the printing plate. The ink employed for the characters themselves, however, will be photo-opaque and will be clearly rendered in the photo plate making process.

I have described above a process for making printed matter from sheet material which fulfills the objects and advantages as stated. The invention, however, will be limited only as specified in the claims which follow.

What is claimed is:

1. The method of forming printing characters suitable for photographing, comprising the steps, causing to be formed a grid of crossed lines defining a plurality of generally rectangular fields on a surface of sheet material with the lines formed of a marking material rendered invisible when photographed, causing characters to be printed on the surface of the sheet material with a character placed within each rectangular field and the characters being formed by a marking material which is visible when photographed, stacking a plurality of sheets with like indicia thereon so that the grids on the stacked sheets are in substantial registration thus forming a pad from the sheets, wrapping the pad by covering the surfaces thereof with a transparent adhesive material, cutting the pad along parallel grid lines to form strips each one field wide and having a length and thickness equal to that of the pad, treating the surfaces of the strips exposed in the cutting operation with an adhesive material, placing the strips together such that the fields on adjacent strips are aligned to substantially reconstitute the pad, wrapping the reconstituted pad with a transparent adhesive material along the end and top portions, cutting the reconstituted pad along the other parallel grid lines 90° to the initial cuts to form stacks of like print characters adhesively connected in a stack-form along two opposite sides and placing the stacks of characters into a type selector board.

2. The method of claim 1 and including the step of removing the transparent adhesive matter applied in the final wrapping step from the top and bottom of the stacks formed by the final cutting step.

3. The method of claim 1, including the step of causing to be formed a grid comprised of double lines spaced closely to define a corridor therebetween, and subsequently cutting the pad along the corridor.

4. The method of claim 1 in which characters in the form of ideograms are printed in the rectangular fields.

* * * * *